United States Patent
Ogale (10) Patent No.: US 11,384,788 B2
(45) Date of Patent: Jul. 12, 2022

(54) THERMOPLASTIC TIE-ROD

(71) Applicant: The Boeing Company, Chicago, IL (US)

(72) Inventor: Amol Ogale, Munich (DE)

(73) Assignee: THE BOEING COMPANY, Chicago, IL (US)

( * ) Notice: Subject to any disclaimer, the term of this patent is extended or adjusted under 35 U.S.C. 154(b) by 58 days.

(21) Appl. No.: 16/674,358

(22) Filed: Nov. 5, 2019

(65) Prior Publication Data

US 2021/0131483 A1    May 6, 2021

(51) Int. Cl.
*F16C 7/02* (2006.01)
*B29C 70/06* (2006.01)
*B29L 31/06* (2006.01)

(52) U.S. Cl.
CPC .............. *F16C 7/026* (2013.01); *B29C 70/06* (2013.01); *B29L 2031/06* (2013.01)

(58) Field of Classification Search
CPC ........ F16C 7/026; F16C 2326/43; F16C 7/06; F16C 3/06; B29C 70/06; B29C 70/222; B29C 66/721; B29C 66/5344; B29L 2031/06; E04C 3/291; B64C 1/066; B64D 11/00; Y02T 50/40; Y10T 428/24008; F16D 1/108
See application file for complete search history.

(56) References Cited

U.S. PATENT DOCUMENTS

| 4,401,841 A * | 8/1983 | Meyer ................... B29C 70/222 174/209 |
| 4,841,801 A | 6/1989 | Tice |
| 8,667,754 B2 | 3/2014 | Schalla et al. |
| 9,908,634 B2 | 3/2018 | Shome |
| 10,406,729 B2 | 9/2019 | Gaw et al. |
| 2010/0209185 A1* | 8/2010 | Kirth ................... B29C 37/0082 403/292 |
| 2013/0078050 A1* | 3/2013 | Diehl ..................... B21J 15/147 411/38 |
| 2016/0221069 A1* | 8/2016 | Diehl ..................... F16B 37/065 |
| 2017/0198734 A1* | 7/2017 | Bernard .................... F16B 7/02 |
| 2017/0356583 A1* | 12/2017 | Gill ......................... C08L 63/00 |

(Continued)

FOREIGN PATENT DOCUMENTS

EP          1798429 A1    6/2007
WO    WO 2013/164243 A1 *  11/2013   ............... F16C 7/06

(Continued)

OTHER PUBLICATIONS

Definition of circumference, merriam-webster.dictionary.com, May 5, 2021 (Year: 2021).*

(Continued)

*Primary Examiner* — Vinh Luong
(74) *Attorney, Agent, or Firm* — Coats & Bennett, PLLC (57) ABSTRACT

A tie rod that includes a central section, a first tapered section, and a second tapered section. A thermoplastic tube extends the length of the tie rod. The first tapered section includes a first insert positioned within the thermoplastic tube. The second tapered section includes a second insert positioned within the thermoplastic tube. A channel extends through the tie rod along the central section, the first tapered section, and the second tapered section.

20 Claims, 8 Drawing Sheets

(56) References Cited

U.S. PATENT DOCUMENTS

2019/0128449 A1\* 5/2019 Beale ............... F16B 7/182
2019/0376543 A1\* 12/2019 Gurvich ............ F16L 9/14
2021/0025526 A1\* 1/2021 Baird ............... F16L 49/02
2021/0108745 A1\* 4/2021 Gill ................ B29C 65/56

FOREIGN PATENT DOCUMENTS

WO     WO 2015039804 A1 \* 3/2015
WO     WO 2019/223957 A1 \* 11/2019 ............ F16C 7/02

OTHER PUBLICATIONS

Define boundary, Google Search, Feb. 26, 2022 (Year: 2022).\*
Define circumference, Google Search, Feb. 26, 2022 (Year: 2022).\*

\* cited by examiner

THERMOPLASTIC TIE-ROD

TECHNOLOGICAL FIELD

The present disclosure relates generally to the field of tie rods and, more specifically, to tie rods constructed from thermoplastic tubes and inserts mounted in the opposing ends of the tubes.

BACKGROUND

A tie rod is a slender, elongated member used to tie together two or more structures. The tie rods are configured for the opposing ends to be connected to various structures and can include a geometry with a large length-to-cross-section ratio. In vehicles such as aircraft, tie rods can be used to support various structural components in the wings and to support components within the cabin and cargo hold. In vehicles such as automobiles, trains, and trucks, tie rods can be used as part of the steering mechanism, running gear, and drive wheels to transmit power. In buildings, tie rods can be used to reinforce walls to prevent failure due to lateral forces.

Existing tie rods can be constructed from a variety of different materials. One tie rod example is constructed from a thermoset composite material. However, this material may result in the tie rod being prohibitively expensive and not practical for use. The expense is compounded when a vehicle requires a large number of tie rods, such as to support structures along the length of a commercial aircraft fuselage or along the wings. Another example includes a tie rod having a metallic construction. However, these tie rods may be heavy and limit their applicability. For example, excessively heavy tie rods may not be applicable for use with aircraft.

The design of the tie rods should provide for efficient manufacturing. The materials and components should provide for an economical design that meets the necessary structural requirements. The manufacturing can further provide for limiting the amount of wasted material.

SUMMARY

One aspect is directed to a tie rod comprising a thermoplastic tube with a first tapered section, a second tapered section, and a central section extending between the first and second tapered sections. A central channel extends through the first tapered section, the second tapered section, and the central section. A first insert is positioned in the thermoplastic tube at the first tapered section and a second insert is positioned in the thermoplastic tube at the second tapered section. Each of the first and second inserts comprise a length measured between an outermost end and an innermost end. A first external circumferential boundary of the first insert is equal along the length between the outermost end and the innermost end. A second external circumferential boundary of the second insert is equal along the length between the outermost end and the innermost end.

In another aspect, the first and second external circumferential boundaries are equal.

In another aspect, each of the first and second inserts comprises: a body with an inner surface and an outer surface with the body comprising an outer width that tapers downward from the outermost end to the innermost end; an opening that extends through an interior of the body between the outermost end and the innermost end; and fins that extend radially outward from the outer surface and that are spaced apart around an external circumferential boundary circumference of the body.

In another aspect, the fins comprise a height measured between the outer surface of the body and an outer edge with the height tapering along the body and being the largest at the outermost end and smallest at the innermost end.

In another aspect, each of the first and second inserts further comprise a threaded member positioned within the opening at the outermost end with the threaded member comprising a threaded opening having interior threads that are exposed.

In another aspect, an annular end cap is mounted to the outermost end of each of the first and second inserts with the end cap comprising an opening that aligns with the opening.

In another aspect, channels extend within each of the first and second inserts with the channels extending between the inner surface and the outer surface.

In another aspect, the tube is attached to each of the first and second inserts and fibers within the tube have a bowed shape at the channels and extend into the channels.

In another aspect, the central section comprises a constant width.

One aspect is directed to a tie rod comprising a first tapered section, a second tapered section, and a non-tapered central section positioned between the first and second tapered sections. A thermoplastic tube extends along the first and second tapered sections and the non-tapered central section. A first insert is positioned within the thermoplastic tube at the first tapered section. A second insert is positioned within the thermoplastic tube at the second tapered section. Each of the first and second inserts comprises a tapered body and radial fins. Each of the first and second inserts comprise a length and have a circumference that is equal along the length.

In another aspect, the first insert is aligned at a first end of the thermoplastic tube and the second insert is aligned at an opposing second end of the thermoplastic tube.

In another aspect, a channel extends the length of the tie rod with the channel being formed by openings within each of the first and second inserts and a hollow interior of the thermoplastic tube.

In another aspect, the thermoplastic tube further comprises braided fibers.

In another aspect, the tapered body of each of the first and second inserts comprises an outer width that tapers from an enlarged outermost end to a smallermost inner end, and the radial fins comprise a height that decreases from the outermost end towards the innermost end.

One aspect is directed to a method of manufacturing a tie rod. The method comprises: positioning inserts within first and second ends of a thermoplastic tube; and preventing the thermoplastic tube from wrinkling while forming a first tapered section at the first end of the tube and a second tapered section at the second end of the tube by conforming the thermoplastic tube to radial fins and tapered bodies of the first and second inserts.

In another aspect, the method comprises applying a vacuum to an interior of the inserts and sealing the tube against channels that extend through the inserts.

In another aspect, the method comprises deforming fibers in the tube into the channels in the inserts.

In another aspect, the method comprises aligning openings in each of the first and second inserts with a hollow interior in the tube and forming a channel that extends through the tie rod.

In another aspect, the method comprises attaching end caps to outermost ends of each of the inserts and then adhering the thermoplastic tube to the inserts.

In another aspect, the method comprises forming a central section along the tie rod between the first and second tapered sections with the central section comprising a constant outer width.

The features, functions and advantages that have been discussed can be achieved independently in various aspects or may be combined in yet other aspects, further details of which can be seen with reference to the following description and the drawings.

DETAILED DESCRIPTION

Figure 1:
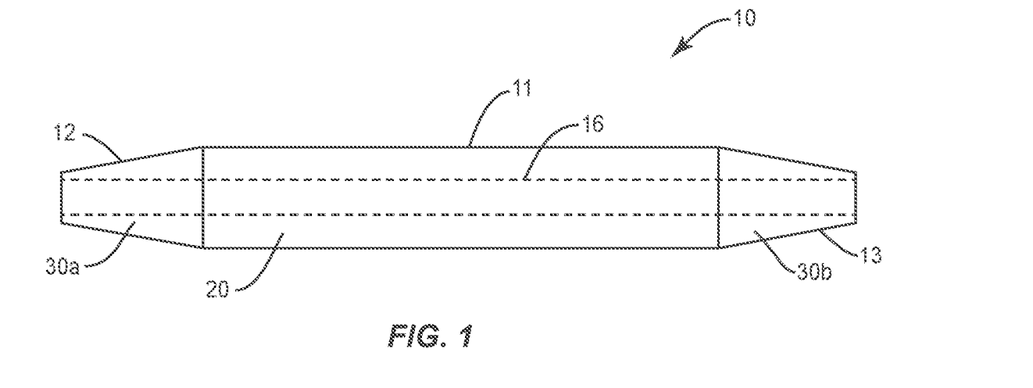
FIG. 1 is schematic side view of a tie rod.

FIG. 1 illustrates a schematic diagram of a tie rod 10 that includes a central section 11, a first tapered section 12, and a second tapered section 13. A thermoplastic tube 20 extends the length of the tie rod 10. The first tapered section 12 includes a first insert 30a positioned within the thermoplastic tube 20. The second tapered section 13 includes a second insert 30b positioned within the thermoplastic tube 20. A channel 16 extends through the tie rod 10 along the central section 11, first tapered section 12, and the second tapered section 13.

Figure 2:
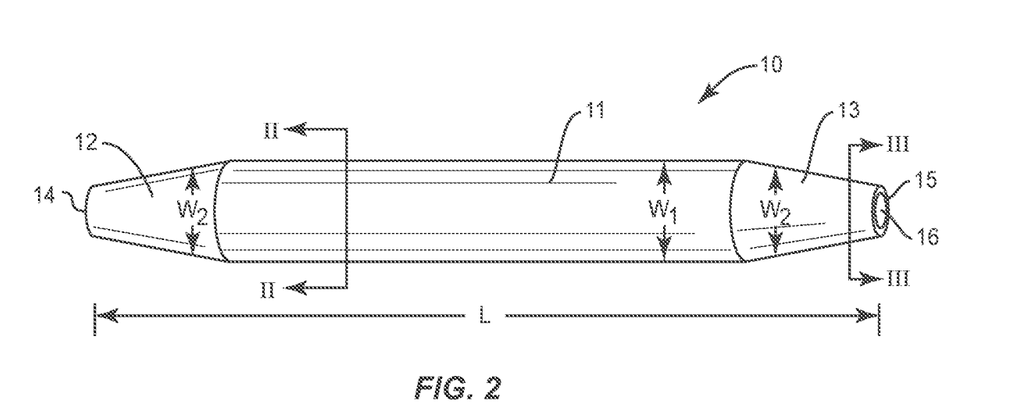
FIG. 2 is a perspective view of a tie rod.

As illustrated in FIG. 2, the tie rod 10 includes a length L measured between a first end 14 at the first tapered section 12 and a second end 15 at the second tapered section 13. The length L can vary depending upon the context of use. In one example, the length L can be up to 52 inches. The central section 11 includes a width W1. In one example, the width W1 is the same along the length of the central section 11. In another example, the width W1 varies along the length of the central section 11. Each of the first and second tapered sections 12, 13 include a width W2. The width W2 of each of the first and second tapered sections 12, 13 is the largest at the central section 11 and tapers outward towards the narrower ends 14, 15 respectively. In one example, the taper is consistent along the length of the first and second sections 12, 13. In another example, the taper various along one or both of the lengths. The widths of the various sections of the tie rod 10 can vary. In one example, the central section 11 includes a width W1 of between about 1-2 inches. In one example, the tapered sections 12, 13 narrow to a width W2 of between about ¼-½ inches at the out ends of the tie rod 10.

Figure 2A:
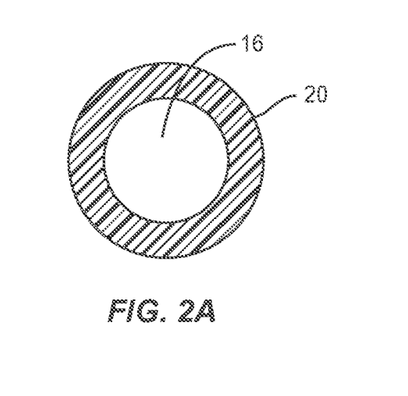
FIG. 2A is a section view cut along line II-II of FIG. 2.

The central section 11 is formed by the tube 20 that extends around the channel 16. As illustrated in FIG. 2A, the central section 11 and channel 16 each include a circular sectional shape. One or both of the central section 11 and channel 16 can also include other sectional shapes, such as but not limited to polygonal and oblong.

Figure 2B:
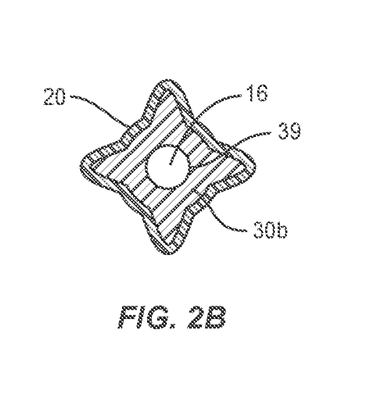
FIG. 2B is a section view cut along line III-III of FIG. 2.

The first and second tapered sections 12, 13 are formed by the tube 20 and one of the inserts 30a, 30b respectively. FIG. 2B illustrates a section view along the second tapered section 13. The insert 30b is positioned within the interior of the tube 20. The channel 16 extends through the second tapered section 13 and is formed by an opening 39 within the interior of the insert 30b. The first tapered section 12 includes the same construction as the second tapered section. This construction includes an insert (i.e., the first insert 30a) positioned within the tube 20. The channel 16 extends through and is formed by an opening 39 in the insert (i.e., the first insert 30a).

The first and second tapered sections 12, 13 can include the same shape and size. This includes the same length, taper, and width of the opening 39. Other designs include the first and second tapered sections 12, 13 including at least one different shape and/or size.

The channel 16 extends the length L of the tie rod 10. In one example, the channel 16 includes the same width along the length L of the tie rod 10. In another example, the width of the channel 16 is different along the central section 11 than along the first and second tapered sections 12, 13. In another example, the size and/or shape varies along the length L.

Figure 3:
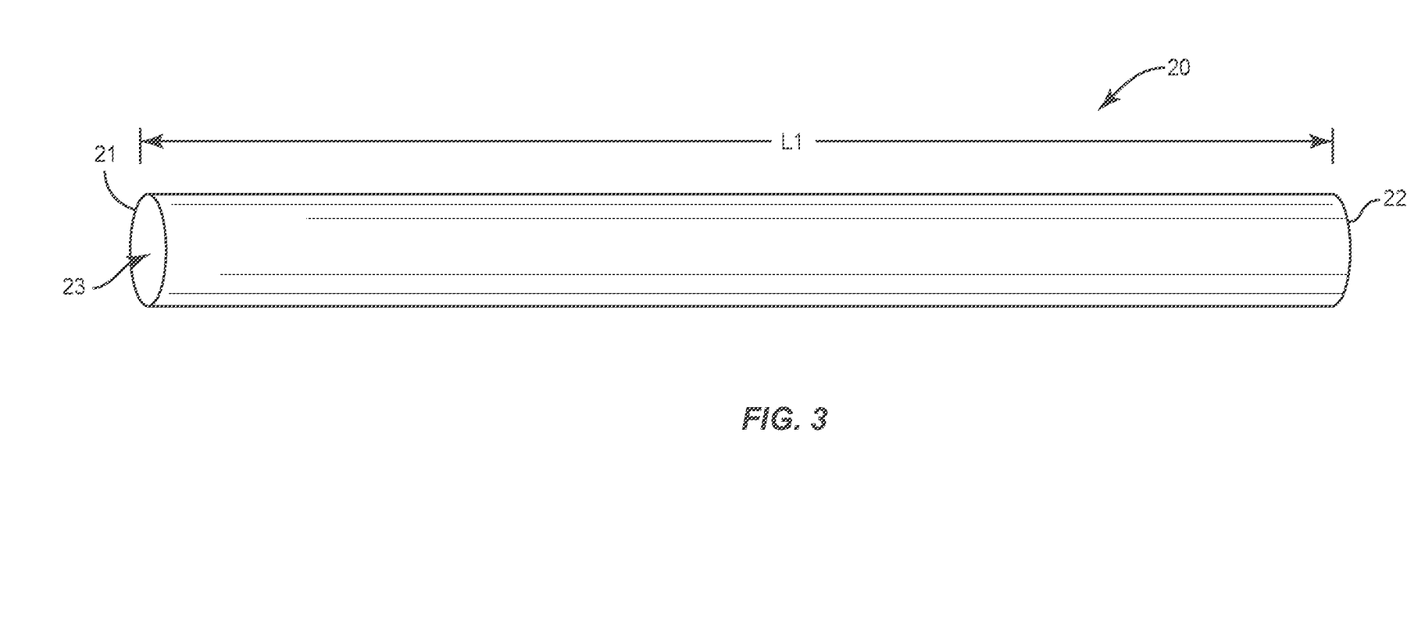
FIG. 3 is a perspective view of a tube.

As illustrated in FIG. 3, the tube 20 includes an elongated shape with ends 21, 22. The tube 20 includes a hollow interior 23 that extends along the length L1. Prior to being tapered along the inserts 30a, 30b, the tube 20 includes a substantially constant diameter along the length L1.

The tube 20 includes a thermoplastic material with reinforcing fibers. The thermoplastic can include but is not limited to PEI (polyetherimide) PPS (polyphenylene sulphide), PES (polyethersulfone), PEEK (polyetheretherketone), PEKK (polyetherketoneketone), and PEKK-FC (polyetherketoneketone-fc grade). In one example, the fibers are pre-impregnated (prepreg) with the thermoplastic material. The fibers can be any of a variety of high strength fibers, such as but not limited to carbon, metal, ceramic and glass fibers. The fibers can be aligned in various orientations relative to the length L1 of the tube 20, such as a 0° degree fiber orientation in which the fibers are generally aligned along the length L1. The fibers can also be orientated at different angular positions relative to the length L1. The fibers can be spaced apart, or can be braided together in mechanically interlocking relationship. Examples include the fibers formed in a bi-axial and/or tri-axial braided pattern.

Figure 4:
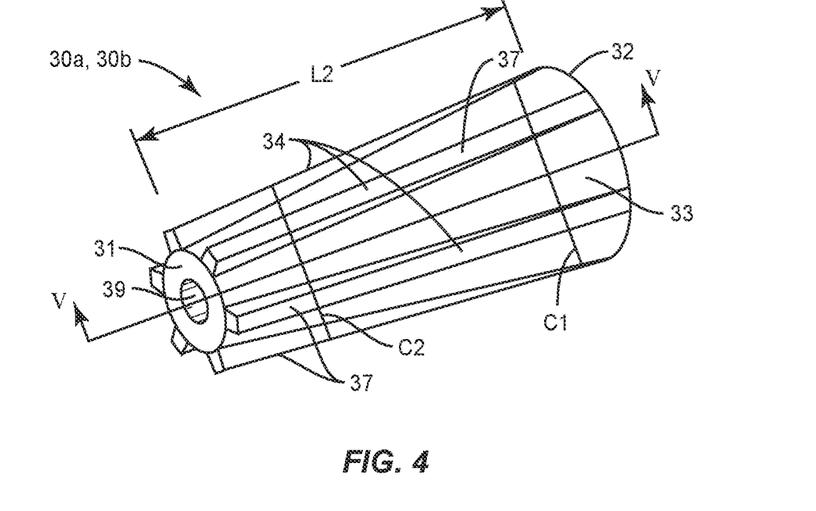
FIG. 4 is a perspective view of an insert.
Figure 5:
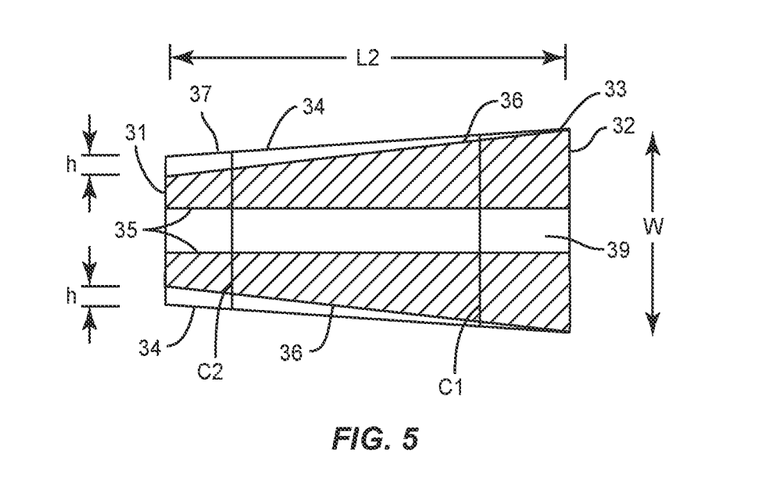
FIG. 5 is a section view of the insert cut along line V-V of FIG. 4.
Figure 6:
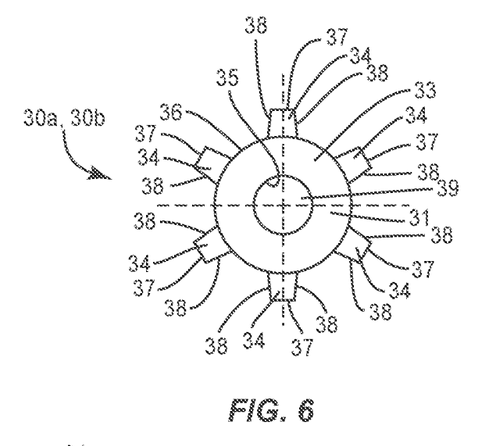
FIG. 6 is an end view of the insert of FIG. 4.

The inserts 30a, 30b are positioned within the tube 20 along the first and second tapered sections 12, 13 respectively. As illustrated in FIGS. 4, 5, and 6, each of the inserts 30a, 30b includes a body 33 with an outermost end 31 and an innermost end 32. The inserts 30a, 30b includes a length L2 measured between the outermost and innermost ends 31, 32. An opening 39 extends through the body 33. Fins 34 extend radially outward from the body 33.

The body 33 includes an inner surface 35 that extends around and forms the opening 39. The body 33 also includes an outer surface 36. The body 33 includes a width W measured between opposing points of the outer surface 36. The body 33 includes a tapered shape with the width W having a decreasing taper from the innermost end 32 to the outermost end 31. In one example as illustrated in FIG. 5, the taper is consistent between the innermost and outermost ends 32, 31. In another example, one or more sections of the outer surface 36 include a constant width W with one or more additional sections having a decreasing taper. As best illustrated in FIG. 6, the opening 39 and the outer surface 36 include circular sectional shapes. Other examples include one or more of opening 39 and outer surface 36 with a different sectional shape.

The fins 34 extend outward from the outer surface 36 away from the opening 39. The fins 34 include an outer edge 37 and opposing side edges 38. The fins 34 include a height h measured between the outer edge 37 and the outer surface 36 of the body 33. As illustrated in FIGS. 4 and 5, the height h tapers downward from the outermost end 31 that includes the largest height h to the innermost end 32 that includes the smallest height h. Thus, the height h of fins 34 is largest at the outermost end 31 where the width W of the body 33 is the smallest. Conversely, the height h of the fins 34 is the smallest at the innermost end 32 with the width W of the body 33 is the largest. The inverse relationship of the sizes the body 33 and fins 34 provides for an external circumferential boundary of each of the inserts 30a, 30b to be the same along the length L2. As illustrated in FIGS. 4 and 5, the external circumferential boundary C1 at a first point along the length L2 is equal to the external circumferential boundary C2 at a second point along the length L2. At the innermost end 32 the larger body 33 and smaller fins 34 provide for an equal external circumferential boundary as the outermost end 31 with the relatively smaller body 33 and larger fins 34. The intermediate locations along the length L2 also provide for the same external circumferential boundary due to the various relative sizes between the body 33 and fins 34. This equality in external circumferential boundaries along the length L2 facilitates the attachment of the tube 20 over the inserts 30a, 30b to prevent wrinkling as will be explained in detail below.

Figure 7:
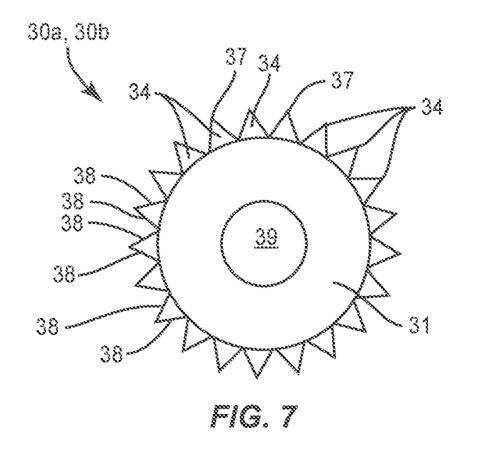
FIG. 7 is an end view of an insert.
Figure 8:
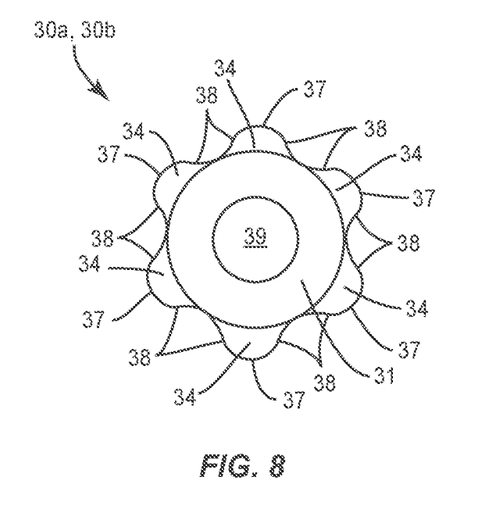
FIG. 8 is an end view of an insert.

The number and shape of the fins 34 can vary. FIGS. 6 and 8 include inserts 30a, 30b with six fins 34 that extend outward from the body 33. FIG. 7 includes inserts 30a, 30b with a greater number of fins 34. The sides and 38 outer edges 37 can include a variety of shapes. In one example as illustrated in each of FIGS. 6, 7, and 8, each of the fins 34 includes the same shape. Other examples include two or more of the fins 34 having different shapes.

The fins 34 can extend in straight line between the outermost and innermost ends 31, 32 as illustrated in FIG. 4.

Another example includes the fins 34 having a helical orientation between the outermost and innermost ends 31, 32.

The inserts 30a, 30b can be constructed from a variety of materials, including but not limited to carbon fiber PEEK (polyetheretherketone (CF-PEEK), carbon fiber polyetherketoneketone (CF-PEKK), and various metals. The inserts 30a, 30b in the tie rod 10 can be constructed from the same or different materials, and can be manufactured in different manners. One example includes injection molding the final insert 30a, 30b. Another example includes forming an injection molded or pultruded rod. The rod is cut into lengths and then machined to for the specific shapes of the body 33 and fins 34. Another example includes 3D printing the inserts 30a, 30b.

Figure 9:
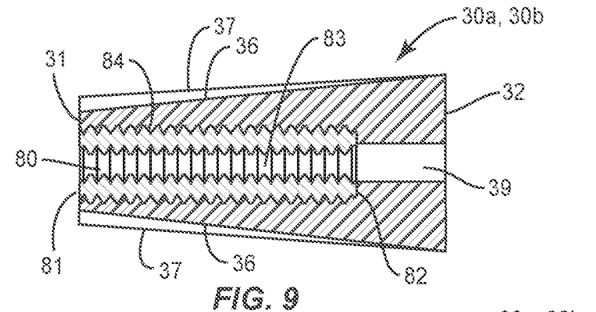
FIG. 9 is a schematic section view of an insert with a threaded member positioned along an opening.

As illustrated in FIG. 9, a threaded member 80 can be mounted within one or both of the inserts 30a, 30b. The threaded member 80 includes an elongated shape with a first end 81 and a second end 82. In one example as illustrated in FIG. 9, the first end 81 is aligned with the outermost end 31 of the insert 30a, 30b. Other examples include the first end 81 recessed inward from the outermost end 31. In one example, the threaded member 80 includes a length that is less than the length L2 of the insert 30a, 30b. This difference in size positions the second end 82 inward from the innermost end 32 of the insert 30a, 30b. In another example, the threaded member 80 is longer than the insert 30a, 30b and extends outward beyond the innermost end 32.

An opening 83 extends through the threaded member 80. Threads 84 extend along the opening 83 and along an outer surface. The threads 84 can extend the entire length of the threaded member 80, or just along a limited section of the length. Threads 84 along the inner side are exposed at the opening 83 and provide for threaded attachment with a structural member. The threads 84 along the outer side can provide for attached to the inner surface 35 of the insert 30a, 30b. In one example, the threaded member 80 is secured with an adhesive within the insert 30a, 30b.

Figure 10:
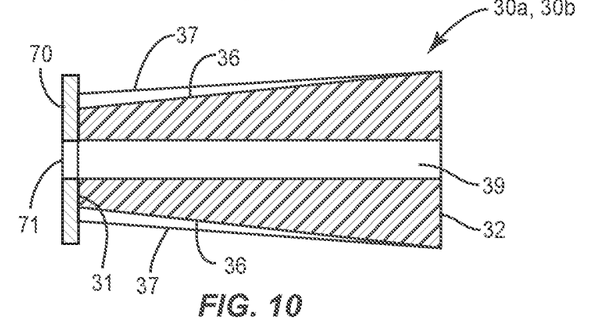
FIG. 10 is a schematic section view of an insert with an end cap.
Figure 11:
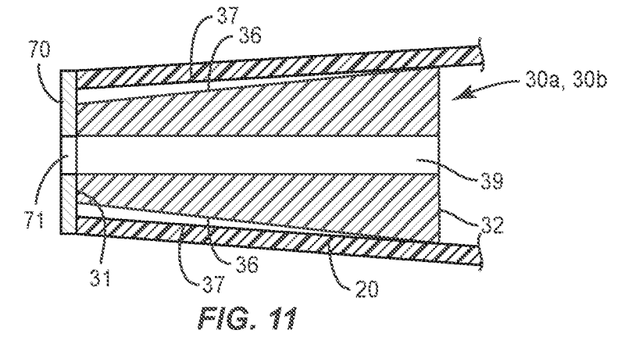
FIG. 11 is a schematic section view of the insert of FIG. 10 with a tube positioned over the insert.

As illustrated in FIG. 10, an end cap 70 can be attached to the outermost end 31 of one or both of the inserts 30a, 30b. The end cap 70 includes an annular shape with a central opening 71 that aligns with the opening 39. The end cap 70 can include a relatively thin, flat shape with an inner surface that matches and abuts against the outermost end 31. In one example, the opening 71 includes the same or larger diameter as the opening 39 so the end cap does not extend across any portion of the opening 39. The end cap 70 can extend radially outward beyond the insert 30a, 30b. As illustrated in FIG. 11, the tube 20 that extends over the insert 30a, 30b can include a thickness such that the outer surface of the tube 20 is flush with the outer edge of the end cap 70.

Figure 12:
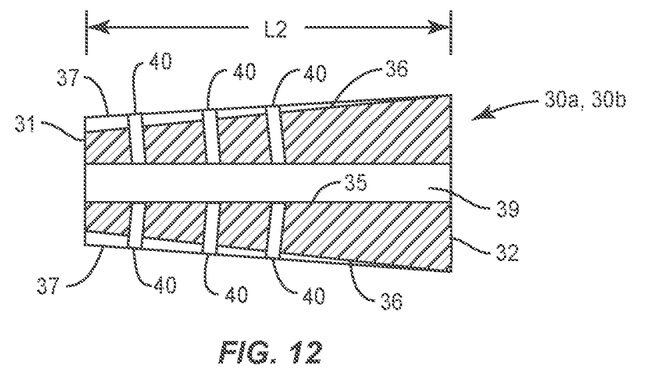
FIG. 12 is a schematic section view of an insert with channels.

One or more channels 40 can extend through one or both inserts 30a, 30b as illustrated in FIG. 12. The channels 40 provide for applying a vacuum to the tube 20 during the manufacturing process. The channels 40 can also cause one or more of the fibers in the tube 20 to bow inward and extend into the channels 40 (see FIG. 16). The channels 40 extend through the insert 30a, 30b between the inner and outer surfaces 35, 36 of the body 33. One or more of the channels 40 can extend from the inner surface 35 and terminate along the fins 34. These one or more channels 40 in the fins 34 can extend through the outer edge 37 or one or both sides 38.

The channels 40 can be located along the entire length L2 or one or more limited sections of the inserts 30a, 30b. In one example, the channels 40 are located along the length L2 in closer proximity to the outermost end 31 than to the innermost end 32. In one specific example, the channels 40 are positioned along the outer half of the inserts 30a, 30b (i.e., between the outermost end 31 and a mid-point along the length L2). This positions the channels 40 where the fins 34 include a larger height h and provides for conforming the tube 20 along the fins 34.

Figure 13:
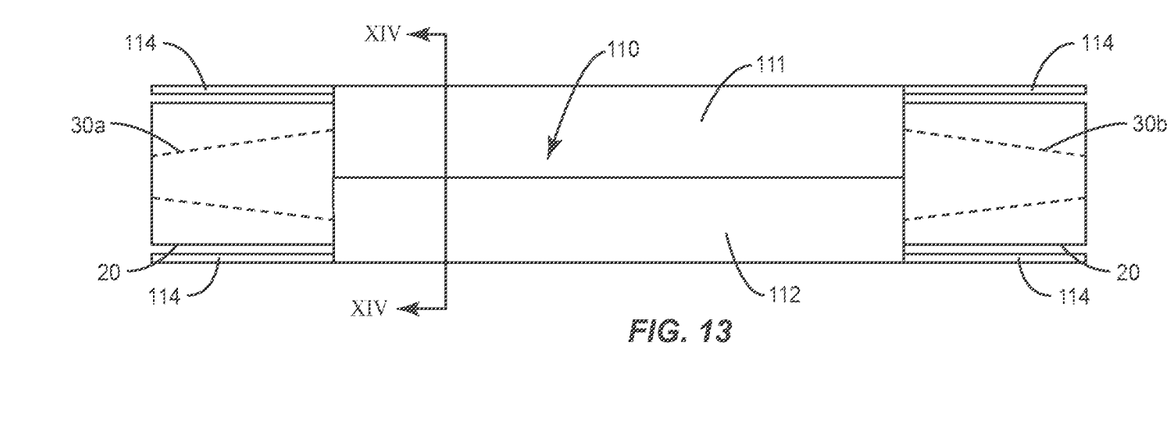
FIG. 13 is s schematic view of a tube positioned within a holding tool and with sections extending outward from opposing sides of the holding tool and positioned between heating tools.
Figure 14:
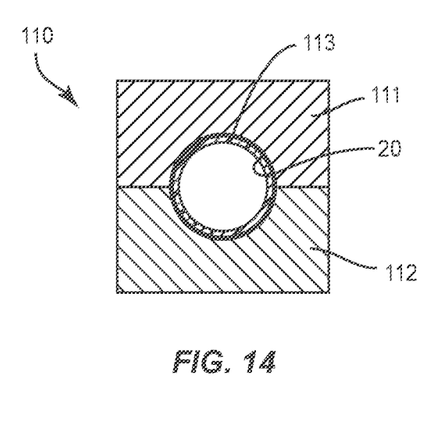
FIG. 14 is a section view cut along line XIV-XIV of FIG. 13 of a central section of a tube positioned within a holding tool.

The inserts 30a, 30b are designed to prevent wrinkling of the tube 20 during the manufacturing process. As illustrated in FIGS. 13 and 14, the tube 20 is initially secured within a holding tool 110. The holding tool 110 can include multiple sections 111, 112. The sections 111, 112 engage together and form a cavity 113 that receives the tube 20. The thermoplastic tube 20 extends outward from each end of the holding tool 110 with the first end 21 of the tube 20 extending outward on a first side of the holding tool 110 and the second end 22 extending outward on a second side.

The inserts 30a, 30b are inserted into the ends 21, 22 of the tube 20. In one example, the inserts 30a, 30b are inserted after the central section 11 of the tube 20 is positioned within the holding tool 110. In another example, the inserts 30a, 30b are inserted prior to positioning the tube 20 within the holding tool 110. The inserts 30a, 30b can be inserted such that the outermost end 31 of insert 30a is aligned with the end 21 of the tube 20, and outermost end 31 of insert 30b is aligned with the end 22 of the tube 20. One or both inserts 30a, 30b can also be inserted farther into the interior of the tube 20.

Heating tools 114 are positioned over the exposed sections of the tube 20. In one example as illustrated in FIG. 13, the heating tools 114 can have a length to extend along the entire length of the inserts 30a, 30b (i.e., between the holding tool 110 and the ends 21, 22 respectively). The heating tools 114 are configured to elevate the temperature of the exposed sections of the tube 20 to a predetermined temperature. This temperature provides for the thermoplastic tube 20 to be pliable and able to be reshaped around the inserts 30a, 30b. The heating tools 114 can extend around an entirety or one or more limited sections of the tube 20. FIG. 13 schematically illustrates the heating tools 114 positioned on opposing sections of the tube 20 (i.e., top and bottom sections). Other examples can include the heating tools 114 positioned along one or more different sections.

Figure 15:
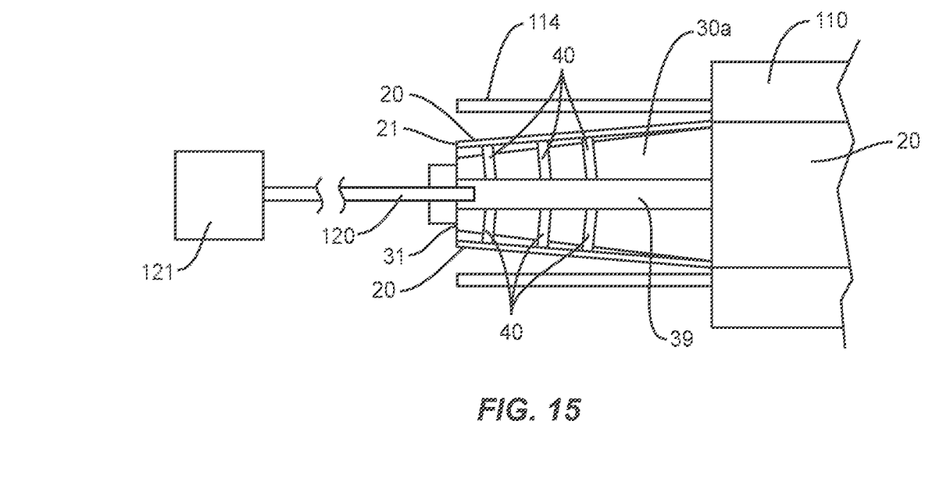
FIG. 15 is a schematic section view of a nozzle and vacuum source attached to an insert to apply a vacuum to conform a tube along an exterior of the insert.
Figure 16:
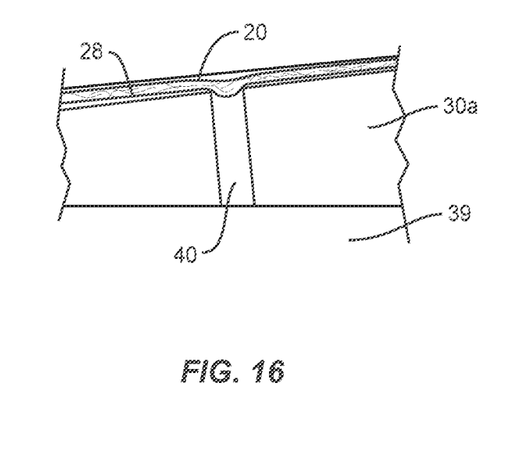
FIG. 16 is a partial schematic section view of the tube of FIG. 15 with one or more fibers of the tube bowed into a channel in the insert.

A vacuum can be applied to one or both inserts 30a, 30b to conform the tube 20 around the inserts 30a, 30b. FIG. 15 illustrates a nozzle 120 inserted into the opening 39 at the outermost end 31 of the insert 30a. The nozzle 120 is operatively connected to a vacuum source 121 that pulls the air from the opening 39. This causes a suction force to be applied through the channels 40 to pull the tube 20 inwards towards the insert 30a. In one example as illustrated in FIG. 16, the tube 20 is pulled into contact with the outer surface 36 of the body 33 and the fins 34. The tube 20 and fibers 28 in the tube 20 can be pulled into the channels 40 causing the fibers 28 to have a bowed shape at the channels 40. This bowed shaped can provide for securely attaching the tube 20 to the inserts 30a, 30b and prevent disengagement of the inserts 30a, 30b.

In one example, the vacuum is applied while one or more of the heating tools 114 are heating the tube 20. In another example, the vacuum is applied after the heating tools 114 have heated the tube 20 and have been removed.

Figure 17:
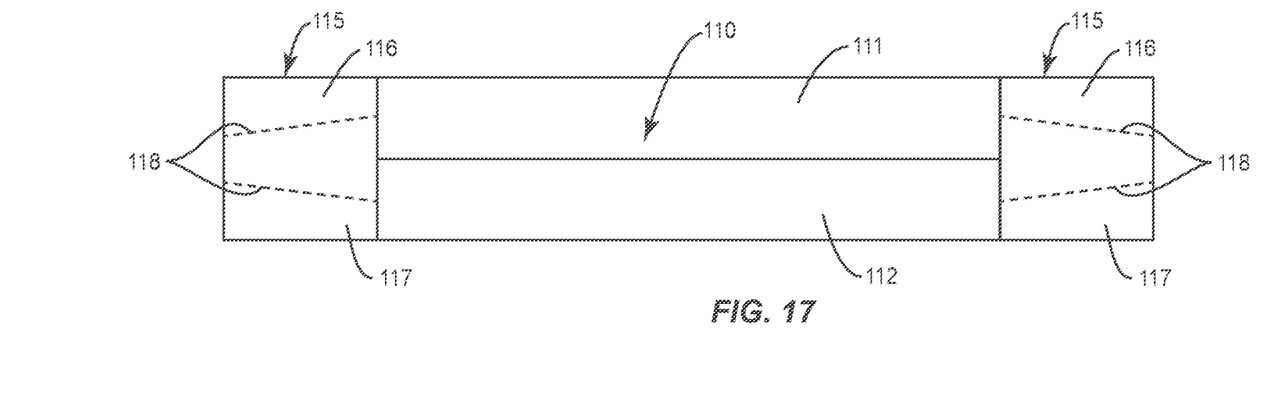
FIG. 17 is a schematic section view of a holding tool secured to a central section of a tube and tapering tools positioned at outer ends of the tube.

After the tube 20 is heated, tapering tools 115 can be applied to the exposed ends as illustrated in FIG. 17. Each of the tapering tools 115 can be constructed from two or more different sections 116, 117 that can extend around the inserts 30a, 30b respectively and the tube 20. The tapering tools 115 include inner surfaces 118 with a tapered shape to form the tube 20 around the inserts 30a, 30b. In one example, the inner surfaces 118 include cut-outs that correspond to the fins 34. The tapering tools 115 are placed around the exposed ends of the tube 20 and compressed together thus forcing the tube 20 inward against the inserts 30a, 30b. This provides for forming the tapered shapes for the first and second tapered sections 12, 13. The tapering tools 115 can be applied before or after applying a vacuum. In one example, the tie rod 10 is formed with the tapering tools 115 without the use of the vacuum.

Figure 18:
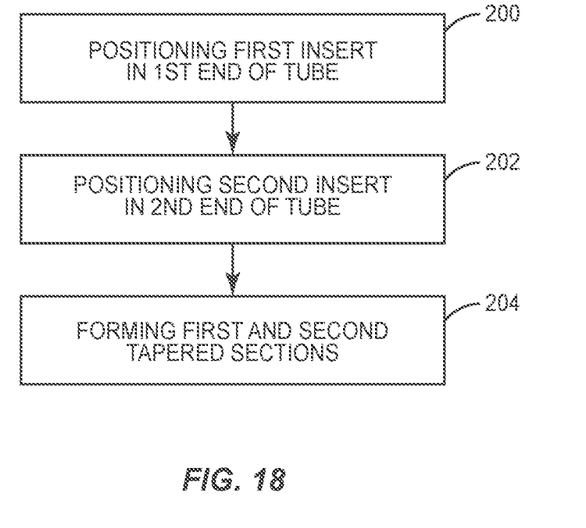
FIG. 18 is a flowchart diagram illustrating steps of a method of manufacturing a tie rod.

FIG. 18 illustrates a method of manufacturing a tie rod 10. The method includes positioning inserts 30a, 30b within first and second ends 21, 22 of a thermoplastic tube 20 (blocks 200, 202). The method also includes preventing the thermoplastic tube 20 from wrinkling while forming a first tapered section 12 at the first end 21 of the tube 20 and a second tapered section 13 at the second end 22 of the tube 20 (block 204). This includes conforming the thermoplastic tube 20 to radial fins 34 and tapered bodies 33 of the first and second inserts 30a, 30b. The equal external circumferential boundaries along the lengths of the inserts 30a, 30b prevents the formation of wrinkles during the manufacturing process.

Tie rods 10 can be used in a variety of contexts, including within a variety of different vehicles. Vehicles can include aircraft and watercraft including but are not limited to manned aircraft, unmanned aircraft, manned spacecraft, unmanned spacecraft, manned rotorcraft, unmanned rotorcraft, satellites, rockets, missiles, manned terrestrial vehicles, unmanned terrestrial vehicles, manned surface water borne vehicles, unmanned surface water borne vehicles, manned sub-surface water borne vehicles, unmanned sub-surface water borne vehicles, and combinations thereof. Vehicles can also include various land-based vehicles, including but not limited to cars and trucks.

By the term "substantially" with reference to amounts or measurement values, it is meant that the recited characteristic, parameter, or value need not be achieved exactly. Rather, deviations or variations, including, for example, tolerances, measurement error, measurement accuracy limitations, and other factors known to those skilled in the art, may occur in amounts that do not preclude the effect that the characteristic was intended to provide.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A tie rod comprising:
   a thermoplastic tube comprising a first tapered section, a second tapered section, and a central section extending between the first and second tapered sections;
   a central channel that extends through the first tapered section, the second tapered section, and the central section;
   a first insert positioned in the thermoplastic tube at the first tapered section and a second insert positioned in the thermoplastic tube at the second tapered section, each of the first and second inserts comprising a length measured between an outermost end and an innermost end, each of the first and second inserts comprising a continuously decreasing taper along the length and radial fins that extend outward along the length and with a height of the radial fins that continuously increases along the length;

an entire length of a first external circumferential boundary of the first insert is equal along the length between the outermost end and the innermost end; and an entire length of a second external circumferential boundary of the second insert is equal along the length between the outermost end and the innermost end.

2. The tie rod of claim 1, wherein the first and second external circumferential boundaries are equal.

3. The tie rod of claim 1, wherein each of the first and second inserts comprises:

a body with an inner surface and an outer surface, the body comprising an outer width that tapers downward from the outermost end to the innermost end;

an opening that extends through an interior of the body between the outermost end and the innermost end; and the fins extend radially outward from the outer surface and that are spaced apart around the body, the fins extending radially outward from the body in different directions.

4. The tie rod of claim 3, wherein the fins comprise the height measured between the outer surface of the body and an outer edge, the height tapering along the body and being largest at the outermost end and smallest at the innermost end.

5. The tie rod of claim 3, wherein each of the first and second inserts further comprise a threaded member positioned within the opening at the outermost end, the threaded member comprising a threaded opening having interior threads that are exposed.

6. The tie rod of claim 3, further comprising an annular end cap mounted to the outermost end of each of the first and second inserts, the end cap comprising an opening that aligns with the opening.

7. The tie rod of claim 3, further comprising channels that extend within each of the first and second inserts, the channels extending between the inner surface and the outer surface.

8. The tie rod of claim 7, wherein the thermoplastic tube is attached to each of the first and second inserts and fibers within the tube having a bowed shape at the channels and extend into the channels.

9. The tie rod of claim 1, wherein the central section comprises a constant outer width.

10. A method of manufacturing the tie rod of claim 1, the method comprising:

positioning the first and second inserts within first and second ends of the thermoplastic tube; and preventing the thermoplastic tube from wrinkling while forming the first tapered section at the first end of the thermoplastic tube and the second tapered section at the second end of the thermoplastic tube by conforming the thermoplastic tube to the radial fins and tapered bodies of the first and second inserts.

11. The method of claim 10, further comprising applying a vacuum to an interior of the inserts and sealing the thermoplastic tube against channels that extend through the inserts.

12. The method of claim 11, further comprising deforming fibers in the thermoplastic tube into the channels in the inserts.

13. The method of claim 10, further comprising aligning openings in each of the first and second inserts with a hollow interior in the thermoplastic tube and forming a channel that extends through the tie rod.

14. The method of claim 10, further comprising attaching end caps to outermost ends of each of the inserts and then adhering the thermoplastic tube to the inserts.

15. The method of claim 10, further comprising forming a central section along the tie rod between the first and second tapered sections with the central section comprising a constant outer width.

16. A tie rod comprising:
a first tapered section;
a second tapered section;
a non-tapered central section positioned between the first and second tapered sections;
a thermoplastic tube that extends along the first and second tapered sections and the non-tapered central section;
a first insert positioned within the thermoplastic tube at the first tapered section;
a second insert positioned within the thermoplastic tube at the second tapered section;
each of the first and second inserts comprising a body that continuously tapers between innermost and outermost ends and radial fins with the radial fins extending outward in different directions away from the tapered body and with a height that increases towards the outermost end; and
each of the first and second inserts comprising a length measured between the innermost and outermost ends and having an external circumferential boundary that is equal along the length.

17. The tie rod of claim 16, wherein the first insert is aligned at a first end of the thermoplastic tube and the second insert is aligned at an opposing second end of the thermoplastic tube.

18. The tie rod of claim 16, further comprising a channel that extends the length of the tie rod, the channel being formed by openings within each of the first and second inserts and a hollow interior of the thermoplastic tube.

19. The tie rod of claim 16, wherein the thermoplastic tube further comprises braided fibers.

20. The tie rod of claim 16, wherein the tapered body of each of the first and second inserts comprises an outer width that tapers from the innermost end downward to the outermost end and the height of the radial fins decreases from the outermost end towards the innermost end.

* * * * *